United States Patent [19]

Funk

[11] Patent Number: 4,717,468
[45] Date of Patent: Jan. 5, 1988

[54] DISTILLATION PROCESS CONTROL FOR MAXIMUM RECOVERY USING MINIMUM ENERGY

[75] Inventor: Gary L. Funk, Bartlesville, Okla.

[73] Assignee: Phillips Petroleum Company, Bartlesville, Okla.

[21] Appl. No.: 9,651

[22] Filed: Jan. 28, 1987

Related U.S. Application Data

[63] Continuation of Ser. No. 812,263, Dec. 23, 1985, abandoned.

[51] Int. Cl.⁴ ............................................... B01D 3/42
[52] U.S. Cl. ............................... 208/356; 208/DIG. 1; 202/206; 202/106; 196/132
[58] Field of Search ............... 208/347, 356, 357, 361, 208/362, 363, 366, DIG. 1; 202/106, 160, 206; 196/132; 203/1, 3, 92, 93–95

[56] References Cited

U.S. PATENT DOCUMENTS

| | | | |
|---|---|---|---|
| 2,774,723 | 12/1956 | Moyer | 208/366 |
| 3,309,287 | 3/1967 | Lupfer et al. | 203/1 |
| 3,428,527 | 2/1969 | Rijnsdorp et al. | 203/1 |
| 3,470,069 | 9/1969 | Bracken et al. | 203/2 |
| 3,567,628 | 3/1971 | Van Pool | 208/356 X |
| 3,996,786 | 12/1976 | Mead et al. | 73/17 A |
| 4,295,196 | 10/1981 | Furr | 196/132 |
| 4,392,877 | 7/1983 | Funk | 202/160 |
| 4,501,657 | 2/1985 | Nollkamper | 202/160 |

*Primary Examiner*—Andrew H. Metz
*Assistant Examiner*—Glenn Caldarola
*Attorney, Agent, or Firm*—Laney, Dougherty, Hessin & Beavers

[57] ABSTRACT

An improved distillation process and apparatus are provided whereby liquid product recovery other than bottom product is maximized and feed stream heating is minimized. Inert gas streams combined with the feed stream and introduced into the distillation tower are controlled whereby feed stream heater residence time and partial pressures of feed stream components are minimized. The temperature of the combined inert gas-feed stream exiting the feed stream heater is controlled at a minimum temperature by establishing signals representative of overflash, bottom product specification and other conditions and comparing such signals whereby the signal which represents the lowest heater outlet temperature is utilized for controlling the heater operation.

17 Claims, 3 Drawing Figures

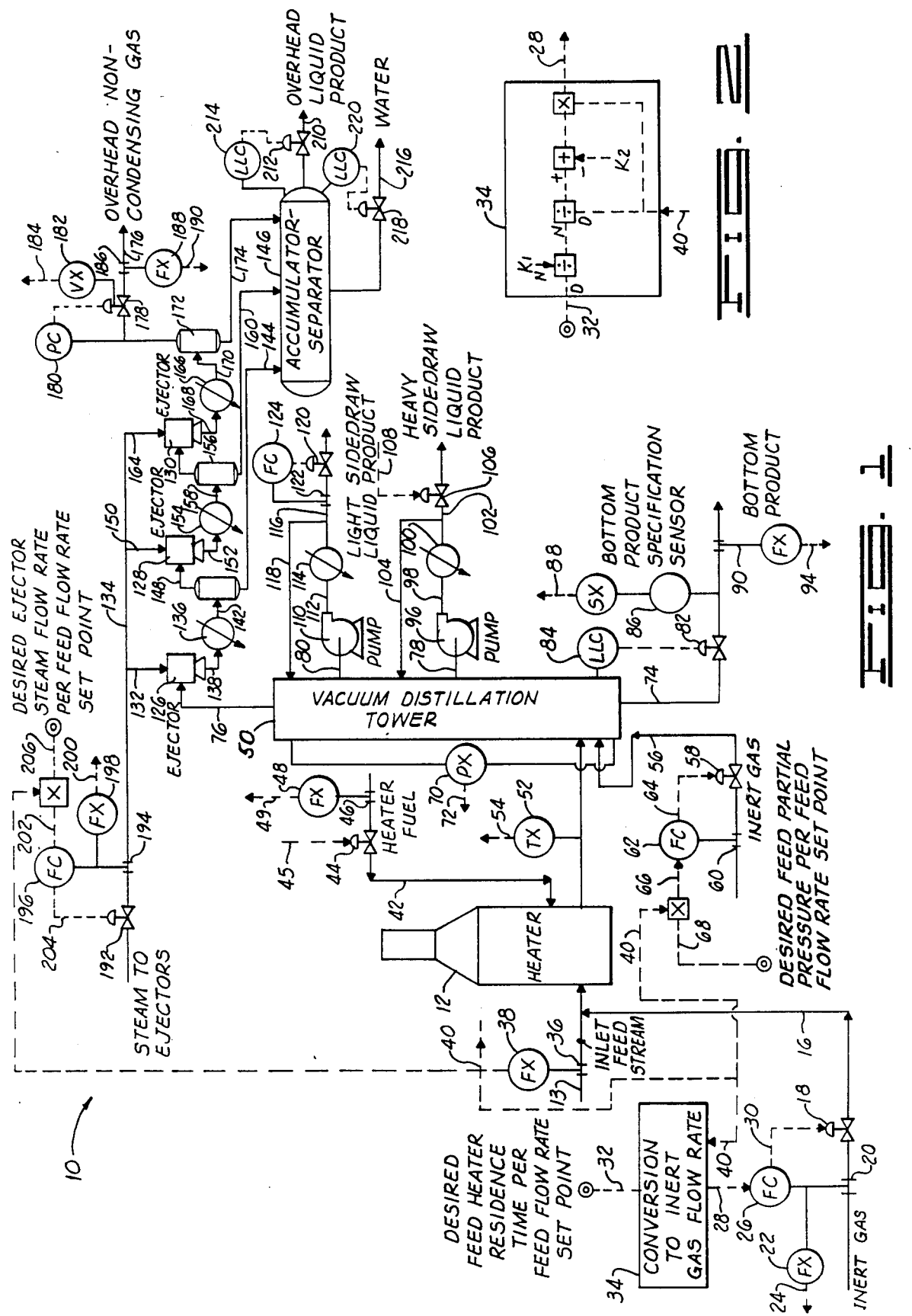

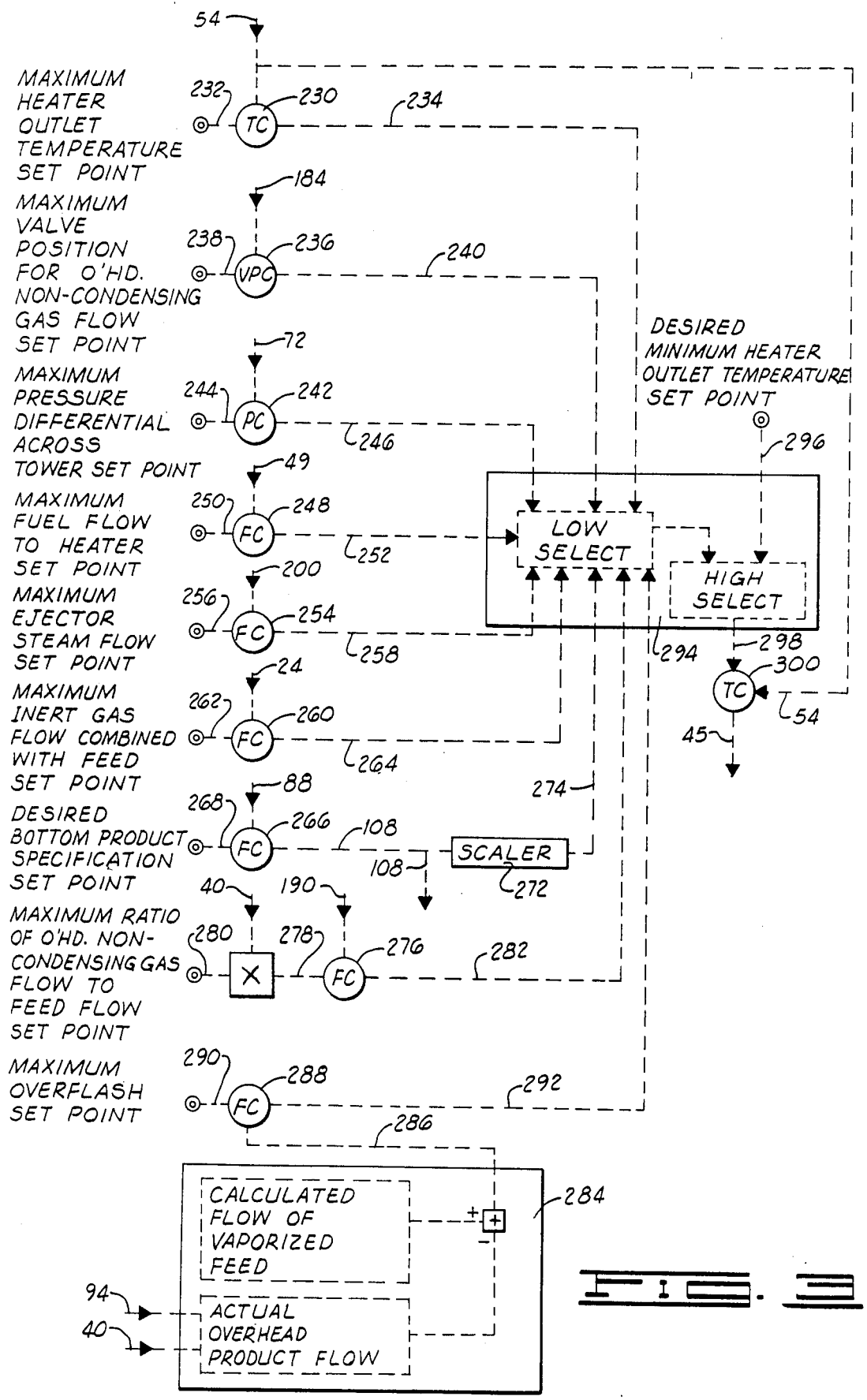

DISTILLATION PROCESS CONTROL FOR MAXIMUM RECOVERY USING MINIMUM ENERGY

This is a continuation of co-pending application Ser. No. 812,263 filed on Dec. 23, 1985, now abandoned.

BACKGROUND OF THE INVENTION

1. Field of the Invention

The present invention relates to an improved distillation process and apparatus whereby maximum sidedraw liquid product recovery is realized utilizing minimum energy. More particularly, the distillation process is controlled in a manner whereby the feed residence time in the feed stream heater, the temperature of the feed stream exiting the heater and the overflash in the distillation tower are mimimized while maintaining the required bottom product specification as well as other process constraints and desired operating conditions.

2. Description of the Prior Art

Distillation processes and apparatus wherein feed streams containing components to be separated are heated and then subjected to distillation whereby a liquid bottom product, one or more sidedraw liquid products, an overhead liquid product and overhead non-condensing gases are produced have been commonly utilized in refining and other similar applications. In such distillation processes where a liquid bottom product of particular specification is required, the objective is to recover as much material as possible from the feed as liquid products other than the bottom product while minimizing the energy required for carrying out the process. For example, in crude oil refining operations, reduced crude oil is commonly subjected to vacuum distillation to separate the crude oil into a bottom asphalt product meeting a minimum viscosity specification, one or more sidedraw liquid products, an overhead liquid product and non-condensing gases. The objective in the operation of such a crude oil distillation process is to recover the maximum quantity of low boiling point components in the liquid products other than the bottom product while satisfying the required bottom product minimum viscosity specification. This requires that the distillation process achieve maximum feed component separation while minimizing coking and and cracking of the feed stream as a result of its being heated.

Distillation processes and apparatus have been developed heretofore wherein inert gas is combined with the feed stream; the combined inert gas-feed stream is heated; the heated stream is introduced into a distillation tower wherein the feed stream is subjected to distillation at a low total tower pressure; inert gas is introduced into the distillation tower to lower the partial pressures of the feed stream components therein; and a liquid bottom product of required specification, one or more sidedraw liquid products, an overhead liquid product and overhead non-condensing gases are withdrawn from the distillation tower. While such processes and apparatus have been operated successfully, the flow rates of the various inert gas streams, the heating of the combined inert gas-feed stream and other process conditions have not been carefully controlled. As a result, maximum recovery of liquid products other than bottom liquid product has not been realized and excess energy has been expended.

By the present invention a distillation process and apparatus are provided wherein, through improved control of process conditions, feed stream heating as well as overall energy consumption are minimized and the recovery of overhead and sidedraw liquid products are maximized while meeting the required liquid bottom product specification.

SUMMARY OF THE INVENTION

The present invention relates to a distillation process wherein a feed stream containing components to be separated is combined with a first inert gas stream; the combined inert gas-feed stream is passed through a feed stream heater whereby it is heated; the heated combined inert gas-feed stream is introduced into a distillation tower wherein the feed stream is subjected to distillation at a low total tower pressure; a second inert gas stream is introduced into the distillation tower; and a liquid bottom product of required specification, one or more sidedraw liquid products, an overhead liquid product and overhead non-condensing gases are withdrawn from the distillation tower. In accordance with the present invention, liquid product recovery other than bottom product is maximized with minimum energy input by maintaining the total distillation tower pressure at a minimum level; controlling the flow rate of the first inert gas stream in proportion to the flow rate of the feed stream, and additionally, in a ratio therewith such that the residence time of the feed stream in the feed stream heater is minimized; controlling the flow rate of the second inert gas stream in proportion to the flow rate of the feed stream, and additionally, at a total flow rate such that the partial pressures of the feed stream components are minimized; and controlling the temperature of the combined inert gas-feed stream exiting the feed stream heater at a temperature whereby minimum overflash is produced in the distillation tower while maintaining the required bottom product specification and other process constraints and operating conditions. Apparatus for carrying out the process is also provided.

It is, therefore, a general object of the present invention to provide an improved distillation process and apparatus which maximize liquid product recovery other than bottom product while minimizing energy consumption.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a diagrammatic illustration of a distillation process of the present invention.

FIG. 2 is a diagrammatic illustration of the manner in which the desired feed heater residence time set point is converted to a desired inert gas flow signal.

FIG. 3 is a diagrammatic illustration of the manner in which the signal utilized to control the heating of the combined inert gas-feed stream is generated in response to a plurality of process measurements.

DESCRIPTION OF THE PREFERRED EMBODIMENT

The distillation process control of the present invention brings about the improved operational results of increasing feed vaporization and separation in the distillation tower while minimizing the heat energy input required. Coking and cracking of feed stream components while passing through the feed stream heater are minimized, and this, coupled with the increased separation in the distillation tower, results in the maximum recovery of liquids other than bottom product.

The improved feed vaporization and separation are achieved by the present invention through the close control of inert gas flow, i.e., maintaining low partial pressures of feed components during heating and in the distillation tower flash zone; maintaining the total pressure on the distillation tower at as low a level as possible; and reducing the residence time of the feed in the feed stream heater by closely controlling the flow rate of inert gas combined with the feed stream. The energy input to the process is maintained at a low level by controlling the temperature of the combined inert gas-feed stream exiting the heater at a mimimum whereby mimimum overflash is produced in the distillation tower while maintaining the required bottom product specification and other process conditions and constraints.

The term "specification" is used herein to mean one or more product characteristics which must be met for the product to be acceptable, e.g., a particular product composition or a property relating to composition such as viscosity, vapor pressure, etc. The term "overflash" is used herein to mean the flow rate of feed components which are vaporized but subsequently condensed and returned to the liquid bottom product. While some overflash is necessary in a distillation process, the creation of excess overflash represents wasted energy input in the form of excessive feed stream heating and excessive heat removal.

The invention is described in terms of a particular configuration of a vacuum distillation process from which a liquid bottom product of required specification, light and heavy sidedraw liquid products, an overhead liquid product and overhead non-condensing gases are recovered. However, the invention is applicable to other distillation process configurations utilizing equivalent apparatus. For example, the invention is applicable to distillation processes which are operated at total distillation tower pressures other than those in the vacuum range, and to distillation processes utilizing equivalent apparatus, e.g., vacuum pumps or other vacuum creating apparatus in lieu of ejectors, various types and kinds of controls and computers, etc.

Referring now to the drawings, and particularly to FIG. 1, apparatus, generally designated by the numeral 10, for carrying out the distillation process of the present invention is illustrated diagrammatically. An inlet feed stream containing components to be separated is conducted to a feed stream heater 12 by a conduit 13. A first stream of inert gas is conducted to the conduit 13 by a conduit 16, and is combined with the inlet feed stream flowing therethrough upstream of the heater 12. A flow control valve 18 is disposed in the conduit 16, and a flow measuring device 20 is disposed in the conduit 16 upstream of the valve 18. The flow measuring device 20 is operably connected to a flow transducer 22 and to a flow controller 26. The flow transducer 22 generates an output signal 24, the use of which will be described hereinbelow. The flow controller 26 functions in a conventional manner to compare the measurement of actual inert gas flow rate generated by the device 20 with a signal 28 representing the desired inert gas flow rate, and developing an output control signal 30 operably connected to the control valve 18. The output signal 30 is scaled to be representative of the valve position required to maintain the actual flow rate of inert gas equal to the desired flow rate. The signal 28 provided the flow controller 26 is derived from a set point signal 32 representative of the desired feed heater residence time per feed flow rate which is converted by a computer 34 to the desired inert gas flow rate signal 28.

As shown in detail in FIG. 2, the computer 34 divides a constant $K_1$ (numerator) by the signal 32 representative of desired residence time per feed flow rate (denominator) and then divides the resultant quotient (numerator) by a signal 40 (denominator) which is representative of the flow rate of the inlet feed stream. A second constant $K_2$ is subtracted from the resulting quotient and the remainder is multiplied by the signal 40. The resulting signal 28 is scaled to the inert gas flow rate which results in the feed heater residence time set point. The valves of the constants $K_1$ and $K_2$ are determined empirically.

A flow measurement device 36 is disposed in the feed stream inlet conduit 13 which is operably connected to a flow transducer 38. The flow transducer 38 generates the signal 40 which is representative of the feed stream flow rate. A conduit 42 for conducting fuel to the heater 12 is connected thereto, and the combined inert gas-feed stream flowing through and heated within the heater 12 is conducted to a vacuum distillation tower 50 by a conduit 14 connected between the heater 12 and the tower 50. A flow rate control valve 4 is disposed in the heater fuel conduit 42 and a flow rate measuring device 46 is disposed therein upstream of the control valve 44. The flow rate measuring device 46 is operably connected to a flow transducer 48 which generates a signal 49 representative of the heater fuel flow rate. The control valve 44 is operated in response to a signal 45, the establishment of which will be described in detail hereinbelow. A temperature transducer 52 is operably connected to the conduit 14 and generates a signal 54 which is representative of the combined inert gas-feed stream temperature exiting the heater 12.

A second inert gas stream is conducted to the vacuum distillation tower 50 by a conduit 56. An inert gas flow rate control valve 58 is disposed in the conduit 56, and a flow rate measuring device 60 is disposed therein upstream of the control valve 58. A flow controller 62 is operably connected to the flow rate measuring device 60. The flow controller 62 generates a signal 64 which governs the operation of the control valve 58 in response to the measured inert gas stream flow rate and a desired such rate represented by the signal 66. The signal 66 is derived from a signal 68 representing the desired feed partial pressure per feed flow rate in the distillation tower 50 by multiplying the signal 68 by the signal 40 representative of the inlet feed stream flow rate.

A pressure transducer 70 is operably connected to the vacuum distillation tower 50 whereby the differential pressure across the tower is measured and a signal 72 representative of such differential pressure is generated by the transducer 70. The distillation tower 50 includes connections for withdrawing liquid bottom product therefrom by way of a conduit 74 connected thereto; for withdrawing overhead gases by way of a conduit 76 connected thereto; for withdrawing a heavy sidedraw liquid product therefrom by way of a conduit 78 connected thereto; and for withdrawing a light sidedraw liquid product by way of a conduit 80 connected thereto. The liquid bottom product withdrawal conduit 74 includes a liquid level control valve 82 disposed therein. The operation of the valve 82 is controlled by a liquid level controller 84 operably connected to the distillation tower 50. A bottom product specification sensor 86 is connected to the conduit 74. The sensor 86 is operably connected to a transducer 87 which in turn generates a signal 88 representative of the actual specification of the produced bottom product. A flow rate measuring device 90 is also disposed in the conduit 74 downstream of the control valve 82 which is operably connected to a flow transducer 92. The flow transducer 92 generates a signal 94 which is representative of the flow rate of bottom product being produced.

Heavy sidedraw liquid is withdrawn from the distillation tower 50 by way of the conduit 78 connected thereto which conducts the liquid to a pump 96. The heavy sidedraw liquid is pumped by the pump 96 through a cooler 100 connected thereto by a conduit 98 and through a conduit 102 which conducts heavy sidedraw liquid product to a point of further processing. A portion of the cooled heavy sidedraw liquid is recycled into the distillation tower 50 by way of a conduit 104 connected thereto and to the conduit 102. A flow rate control valve 106 is disposed in the conduit 102 downstream of the conduit 104. The valve 106 is operated by a signal 108, the establishment of which will be described further hereinbelow.

Light sidedraw liquid product is withdrawn from an upper portion of the distillation tower 50 by way of the conduit 80 and a pump 110 connected thereto. Light sidedraw liquid is pumped by the pump 110 through a cooler 114 by way of a conduit 112 connected therebetween and by way of a conduit 116 connected to the cooler 114 to a point of further processing. A light sidedraw liquid flow rate control valve 120 is disposed in the conduit 116, and a conduit 118 is connected between the conduit 116 and the distillation tower 54 for recycling a portion of cooled light sidedraw liquid to the tower 50. A flow rate measuring device 122 is operably connected to a flow controller 124 which governs the operation of the flow rate control valve 120 in accordance with a set point.

In the configuration illustrated in FIG. 1, the overhead gas stream withdrawn from the distillation tower 50 by way of the conduit 76 is pumped whereby a vacuum is produced in the distillation tower 50. The pumping is accomplished by three steam ejectors 126, 128 and 130 connected in series. That is, the conduit 76 is connected to the steam ejector 126. Steam is conducted to the ejector 126 by a conduit 132 connected thereto and to a steam header 134, and the discharge of the ejector 126 is connected to a condensor 136 by a conduit 138. The outlet of the condensor 136 is connected to a separator 140 by a conduit 142, and the liquid discharge of the separator 140 is connected to an accumulator-separator 146 by a conduit 144. The gas outlet of the separator 140 is connected to the ejector 128 by a conduit 148. Steam is conducted to the ejector 128 by a conduit 150 connected to the steam header 134, and the discharge from the ejector 128 is conducted to a condensor 154 by a conduit 152. The discharge of the condenser 154 is conducted to a separator 156 by a conduit 158, and the liquid outlet of the separator 156 is connected to the accumulator-separator 146 by a conduit 160. The gases discharged from the separator 156 are conducted to the ejector 130 by a conduit 162, and steam is conducted to the ejector 130 by a conduit 164 connected to the header 134. The discharge of the ejector 130 is conducted to a condenser 166 by a conduit 168, and the discharge of the condensor 166 is connected to a separator 172 by a conduit 170. The liquid discharge of the separator 172 is connected to the accumulator-separator 146 by a conduit 174, and the gases discharged from the separator 172 are conducted therefrom by a conduit 176 connected thereto.

An overhead gas back-pressure control valve 178 is disposed in the conduit 176. A pressure controller 180 operably connected to the control valve 178 senses the pressure in the conduit 176 upstream of the control valve 178 and operates the control valve relative to a back-pressure set point. A valve position transducer 182 is connected to the control valve 178 which generates a signal 184 representative of the valve position for overhead non-condensing gas flow. A flow measuring device 186 is disposed in the conduit 176 downstream of the control valve 178. The flow measuring device 186 is operably connected to a flow transducer 188 which generates a signal 109 representative of the overhead non-condensing gas flow rate.

A steam flow rate control valve 192 is disposed in the steam header 134, and a flow rate measuring device 194 is disposed therein downstream of the control valve 192. A flow controller 196 is operably connected to the flow rate measuring device 194 as is a flow transmitter 198. The flow transmitter 198 generates a signal 200 which is representative of the flow rate of steam to the ejectors. The flow controller 196 compares a signal 202 representing the desired ejector steam flow rate with the actual ejector steam flow rate to produce a signal 204 which governs the operation of the control valve 192. The signal 202 is derived from a signal 206 which represents the desired ejector steam flow rate per feed flow rate. The signal 206 is multiplied by the signal 40 representative of the flow rate of the inlet feed stream to generate the signal 202.

Condensed light overhead liquid product is withdrawn from the accumulator-separator 146 by a conduit 210 connected thereto having a liquid level control valve 212 disposed therein. The control valve 212 is operated by a liquid level controller 214 operably connected to the accumulator-separator 146. Condensed steam is withdrawn from the accumulator-separator 146 by a conduit 216 having a liquid level control valve 218 disposed therein. The liquid level control valve 218 is operated by a liquid level controller 220 connected to the accumulator-separator 146.

Referring now to FIG. 3, the controls are illustrated which establish the signals 45 and 108. The signal 45 governs the operation of the heater fuel flow rate control valve 44 and the signal 108 governs the operation of the heavy overhead liquid product withdrawal control valve 106. The signal 54 representative of the actual combined inert gas-feed stream temperature exiting the heater 12 is received by a temperature controller 230. A signal 232 representative of the maximum heater outlet temperature is also provided the temperature controller 230. In response to the signals 54 and 232, the temperature controller 230 produces an output signal 234 which is responsive to the difference between signals 232 and 54, and which is scaled so as to be representative of the temperature of the combined inert gas-feed stream exiting the heater 12.

The signal 184 representative of the actual position of the valve 178 controlling distillation column total pressure is provided to a valve position controller 236. A signal 238 representative of the maximum valve position for overhead non-condensing gas flow, i.e., 90% open, is provided to the controller 236, and in response to the signal 184 and 238, the controller 236 provides an output signal 240 which is responsive to the difference between the signals 184 and 238. The signal 240 is scaled so as to be representative of the temperature of the combined inert gas-feed stream exiting the heater 12.

The signal 72 representative of the pressure differential across the tower 50 is provided to a pressure controller 242. A signal 244 representative of the maximum pressure differential across the tower 50 is also provided to the pressure controller 242, and the pressure controller 242 provides an output signal 246 which is responsive to the difference between signals 244 and 72. The output signal 246 is scaled so as to be representative of the temperature of the combined inert gas-feed stream exiting the heater 12.

The signal 49 representative of the flow rate of fuel conducted to the heater 12 is provided to a flow controller 248. A signal 240 representative of the maximum fuel flow to the heater 12 is also provided the flow controller 248. The flow controller 248 provides an output signal 252 which is responsive to the difference between the signals 250 and 49, and which is scaled so as to be representative of the temperature of the combined inert gas-feed stream exiting the heater 12.

The signal 200 representative of the actual flow of steam to the ejectors 126, 128 and 130 is provided to a flow controller 254. A signal 256 representative of the maximum ejector steam flow is also provided the flow controller 254. The flow controller 254 provides an output signal 258 which is responsive to the difference between the signal 256 and 200, and which is scaled so as to be representative of the temperature of the inert gas-feed stream exiting the heater 12.

The signal 24 representative of the flow rate of inert gas combined with the inlet feed stream is provided to flow controller 260. A signal 262 representative of the maximum inert gas flow to be combined with the feed stream is also provided the flow controller 260. The flow controller 260 provides an output signal 264 which is responsive to the difference between signals 262 and 24, and which is scaled so as to be representative of the temperature of the combined inert gas-feed stream exiting the heater 12.

The signal 88 representative of the actual bottom product specification being produced is provided to a flow controller 266. A signal 268 representative of the desired bottom product specification is also provided to the flow controller 266, and the flow controller 266 generates an output signal 108 responsive to the difference between signals 268 and 88. The signal 108 is scaled so as to be representative of the flow rate of heavy sidedraw liquid product withdrawn from the distallation tower 50. The signal 108 is provided to and governs the operation of the heavy sidedraw liquid product control valve 106 whereby the actual bottom product specification is maintained substantially equal to the desired bottom product specification. The signal 108 is also provided to a scaler 272 which generates a signal 274 therefrom scaled so as to be representative of the temperature of the combined inert gas-feed stream exiting the heater 12.

The signal 190 representative of the flow rate of overhead non-condensing gas is provided to a flow controller 276. A signal 280 representative of the maximum ratio of overhead non-condensing gas flow to feed flow is multiplied by the signal 40 representative of the inlet feed stream flow rate to generate a signal 278 representative of the maximum overhead non-condensing gas flow. The flow controller 276 produces a signal 282 which is responsive to the difference between the signals 278 and 190 and which is scaled so as to be representative of the temperature of the combined inert gas-feed stream exiting the heater 12.

The signal 94 which is representative of the flow rate of liquid bottom product produced and the signal 40 which is representative of the flow rate of the inlet feed stream are provided to a computer 284 which calculates the actual overhead product flow rate by dividing the liquid bottom product flow rate by the inlet feed stream flow rate and subtracting the resultant quotient from one. The actual overhead product flow rate is then subtracted from the calculated flow rate of vaporized feed in the distillation tower 50 based on the relationship $K_0[P_t - P_s]/P_t$. In the foregoing relationship $K_0$ is a constant, $P_t$ is the total pressure in the distillation tower 50, and $P_s$ is the partial pressure of steam in the tower 50. The computer 284 thus generates a signal 286 which is representative of the actual overflash in the distillation tower 50 and which is provided to a flow controller 288. A signal 290 representative of the maximum overflash in the tower 50 is also provided the flow controller 288, and the flow controller 288 generates an output signal 292 which is responsive to the difference in the signals 290 and 288, and which is scaled so as to be representative of the temperature of the combined inert gas-feed stream exiting the heater 12.

The signals 234, 240, 246, 252, 258, 264, 274, 282 and 292, all scaled to be representative of the temperature of the combined inert gas-feed stream exiting the heater 12, are all provided to a computer 294 which selects the lowest of such signals. The selected lowest of the signals is then compared with a signal 296 which is representative of the desired minimum heater outlet temperature, and the highest of the two is selected and established as an output signal 298. Thus, the output signal 298 is representative of the lowest temperature of the combined inert gas-feed stream exiting the heater 12 required for maintaining the various desired process conditions and constraints described.

The signal 298 is provided to a temperature controller 300 which also receives the signal 54 representative of the actual heater outlet temperature. The controller 300 generates the output signal 45 which is responsive to the difference in the signals 298 and 54, and which is provided and governs the operation of the heater fuel control valve 44.

In operation of the apparatus 10 and the process carried out thereby, the total pressure exerted within the distillation tower 50 is maintained at the minimum possible by operating the vacuum producing apparatus, i.e., the ejectors 126, 128, and 130 at maximum capacity. That is, the desired ejector steam flow per feed flow signal 206 is set at maximum whereby maximum steam is conducted to the ejectors and the vacuum produced in the distillation tower 50 is maximized. Coking and/or cracking of the feed stream as it is heated in the heater 12 is minimized by the control of the flow rate of inert gas stream combined with the inlet feed stream upstream of the heater 12. That is, the flow rate of inert gas is controlled in proportion to the flow rate of the feed stream, and additionally, in a ratio therewith such that the feed stream residence time is limited within the heater 12 whereby coking or cracking therein are minimized.

The flow rate of the inert gas stream introduced into the distillation tower 50 by way of the conduit 56 is also closely controlled so that the partial pressure of the feed components in the tower 50 is minimized, and as a result, improved vaporization and separation of feed components are realized. The bottom product specification is maintained by varying the withdrawal of the heavy overhead liquid product from the distillation tower. For example, where the bottom product is asphalt and the bottom product specification is a minimum viscosity, when the viscosity is too high, the withdrawal of heavy sidedraw liquid product is reduced and vice-versa. In addition, the overflash in the distillation tower and other desired process operating conditions and constraints are maintained while maintaining the temperature of the inert gas-feed stream exiting the heater 12 at a minimum. That is, the input of heat energy at the heater 12 is minimized which in turn minimizes the overall energy requirements of the process and apparatus.

As mentioned above and as is well understood by those skilled in the art, the apparatus 10 can take various forms other than the form illustrated in FIG. 1 and described above. For example, the distillation tower 50 can be operated at super-atmospheric pressure instead of sub-atmospheric pressure, more or less than two sidedraw liquid products can be withdrawn from the distillation tower, etc. However, the form of the apparatus 10 and the process carried out thereby are particularly suitable for separating crude oil into a bottom asphalt product meeting a minimum viscosity or equivalent specification, heavy and light vacumm gas oil liquids, an overhead liquid product and non-condensing overhead gases. In this application, the first and second inert gas streams are steam, and as indicated above, the objective in the operation of the process and apparatus is to maximize the recovery of liquid products other than the bottom asphalt product while meeting the asphalt product viscosity specification and minimizing energy consumption.

Also, as will be understood, more or less process conditions and/or constraints than those described above can be included in the feed heater operation control system, and the particular process conditions and/or constraints utilized in the control system will vary depending upon the particular process configuration involved and other factors. However, in accordance with this invention, the process conditions of overflash and bottom product specification are always included in the control system to maximize recovery other than liquid bottom product, minimize energy consumption and meet bottom product requirements.

Thus, the present invention is well adapted to carry out the objects and attain the ends and advantages mentioned as well as those inherent therein. While presently preferred arrangements of control apparatus and process steps have been described for purposes of this disclosure, numerous changes in such arrangements will suggest themselves to those skilled in the art, which changes are encompassed within the spirit of this invention as defined by the appended claims.

What is claimed is:

1. In a distillation process wherein a feed stream containing components to be separated is combined with a first inert gas stream, the combined inert gas-feed stream is passed through a heater whereby it is heated, the heated combined inert gas-feed stream is introduced into a distillation tower wherein the feed stream is subjected to distillation at a low total tower pressure, a second inert gas stream is introduced into the distillation tower and a liquid bottom product of required specification, one or more sidedraw liquid products and overhead gases are withdrawn from the distillation tower, the improvement whereby the recovery of liquid product other than liquid bottom product is maximized with minimum energy input while meeting the bottom product specification comprising:

maintaining the total distillation tower pressure at a low level;

controlling the flow rate of said first inert gas stream in proportion to the flow rate of said feed stream and additionally in a ratio therewith such that the residence time of said feed stream in said heater is minimized;

controlling the flow rate of said second inert gas stream in proportion to the flow rate of said feed stream and additionally at a total flow rate such that the partial pressures of said feed stream components are minimized in said tower; and controlling the temperature of the combined inert gasfeed stream exiting said heater at the minimum temperature whereby minimum overflash is produced in said tower while maintaining the required bottom product specification and process conditions.

2. The process of claim 1 wherein the step of controlling the temperature of said combined inert gas-feed stream exiting said heater at the minimum temperature whereby minimum overflash is produced in said tower while maintaining the required bottom product specification and process conditions comprises:

establishing a first signal representative of the maximum overflash in said tower;

establishing a second signal representative of the actual overflash in said tower;

comparing said first and second signals and establishing a third signal which is responsive to the difference between said second signal and said first signal, said third signal being scaled to be representative of the temperature of said combined inert gas-feed stream exiting said heater required to maintain said second signal substantially equal to said first signal;

establishing a fourth signal representative of said required liquid bottom product specification;

establishing a fifth signal representative of the actual specification of the liquid bottom product being produced;

comparing said fourth and fifth signals and establishing a sixth signal which is responsive to the difference between said fifth signal and said fourth signal, said sixth signal being scaled to be representative of the temperature of said combined inert gas-feed stream exiting said heater required to maintain said fifth signal substantially equal to said fourth signal;

selecting the one of said third and sixth signals which represents the lowest temperature of said combined inert gas-feed stream exiting said heater;

establishing a seventh signal representative of the actual temperature of said combined inert gas-feed stream exiting said heater;

comparing the selected lowest of said third or sixth signal with said seventh signal and establishing an eighth signal which is responsive to the difference therebetween whereby said eighth signal increases or decreases when said selected third or sixth signal is greater or less than said seventh signal, respectively; and increasing or decreasing the heating of said combined inert gas-feed stream in said heater and the exit temperature thereof in response to increases or decreases in said eighth signal.

3. The process of claim 2 wherein said second signal representing the actual overflash in said tower is established by subtracting the actual flow rate of overhead product withdrawn from said tower from the calculated total flow rate of vaporized feed within said tower.

4. The process of claim 2 wherein the rate of withdrawal of said sidedraw liquid product is controlled in response to said sixth signal prior to said sixth signal being scaled.

5. The process of claim 2 which is further characterized to include the steps of:

establishing signals representative of maximum and actual levels of one or more other process conditions which change with the temperature of said combined inert gas-feed stream exiting said heater selected from the pressure differential across said distillation tower, the flow rate of overhead non-condensing gas, the flow rate of fuel to said heater, the total distallation tower pressure, and the ratio of the flow rate of overhead non-condensing gas to the flow rate of said feed stream;

comparing the signals representing the maximum and actual levels for each such process condition and establishing an additional signal which is responsive to the differences therebetween, the additional signal being scaled to be representative of the temperature of said combined inert gas-feed stream exiting said heater required to maintain said signals representing desired and actual levels for each process condition substantially equal; and selecting one of said third, sixth and one or more additional signals for comparison with said seventh signal and establishing said eighth signal.

6. The process of claim 5 wherein said distillation tower is operated at vacuum conditions, said feed stream is reduced crude oil, said liquid bottom product is asphalt and the required liquid bottom product specification is minimum asphalt viscosity.

7. The process of claim 6 wherein said first and second inert gas streams are comprised of steam.

8. A distillation process for separating a crude oil feed stream into a liquid bottom product stream of required minimum viscosity, at least one sidedraw liquid product stream and an overhead gas stream comprising the steps of:

(a) combining steam with said crude oil feed stream;

(b) heating the resulting combined stream-crude oil stream in a heater;

(c) varying the flow rate of steam combined with said crude oil stream in step (a) in direct proportion to variations in the flow rate of said crude oil stream and additionally to maintain the ratio of steam to crude oil at a level such that the residence time of the crude oil in said heater is minimized;

(d) introducing said heated steam-crude oil stream into a vacuum distillation tower whereby said crude oil stream is subjected to vacuum distillation therein;

(e) introducing steam into said vacuum distillation tower;

(f) varying the flow rate of said stream introduced into said distillation tower in direct proportion to variations in the flow rate of said crude oil stream and additionally to maintain the ratio of steam to crude oil in said tower at a level such that the partial pressure of crude oil in said tower is minimized;

(g) withdrawing a liquid bottom product stream of required minimum viscosity, at least one sidedraw liquid product stream and an overhead gas stream from said tower;

(h) establishing a first signal representative of the maximum overflash in said tower;

(i) establishing a second signal representative of the actual overflash in said tower;

(j) comparing said first and second signals and establishing a third signal which is responsive to the difference between said second signal and said first signal, said third signal being scaled to be representative of the temperature of said combined inert gas-feed stream exiting said heater required to maintain said second signal substantially equal to said first signal;

(k) establishing a fourth signal representative of said required liquid bottom product minimum viscosity;

(l) establishing a fifth signal representative of the actual liquid bottom product viscosity;

(m) comparing said fourth and fifth signals and establishing a sixth signal which is responsive to the difference between said fifth signal and said fourth signal, said sixth signal being scaled to be representative of the temperature of said combined inert gas-feed stream exiting said heater required to maintain said fifth signal substantially equal to said fourth signal;

(n) selecting one of said third and sixth signals which represents the lowest temperature of said combined inert gas-feed stream exiting said heater;

(o) establishing a seventh signal representative of the actual temperature of said combined inert gas-feed stream exiting said heater;

(p) comparing the selected lowest of said third or sixth signal with said seventh signal and establishing an eighth signal which is responsive to the difference therebetween whereby said eighth signal increases or decreases when said selected third or sixth signal is greater or less than said seventh signal, respectively; and (q) increasing or decreasing the heating of said combined inert gas-feed stream in step (b) and the exit temperature thereof in response to increases or decreases in said eighth signal.

9. The process of claim 8 wherein said second signal representing the actual overflash is established by subtracting the actual flow rate of overhead product withdrawn from said tower from the calculated flow rate of vaporized feed within said tower.

10. The process of claim 8 wherein the withdrawal flow rate of said sidedraw liquid product is controlled in response to said sixth signal prior to said sixth signal being scaled.

11. The process of claim 8 which is further characterized to include the steps of:

establishing signals representative of maximum and actual levels of one or more other process conditions which change with the temperature of said combined inert gas-feed stream exiting said heater selected from the pressure differential across said distillation tower, the flow rate of overhead non-condensing gas, the flow rate of fuel to said heater, the total distillation tower pressure, and the ratio of the flow rate of overhead non-condensing gas to the flow rate of said feed stream;

comparing the signals representing the maximum and actual levels for each such process condition and establishing an additional signal which is responsive to the difference therebetween, the additional signal being scaled to be representative of the temperature of said combined inert gas-feed stream exiting said heater required to maintain said signals representing desired and actual levels for each process condition substantially equal; and selecting one of said third, sixth and one or more additional signals for comparison with said seventh signal and establishing said eighth signal in accordance with step (p).

12. Apparatus for separating a feed stream into a liquid bottom product stream of required specification, at least one sidedraw liquid product stream and an overhead gas stream comprising:

(a) a distillation system for subjecting a feed stream to distillation at a low total pressure including a feed stream heater, a distillation tower and means for withdrawing a liquid bottom product stream, at least one sidedraw liquid stream and an overhead gas stream therefrom;

(b) means for combining an inert gas stream with said feed stream upstream of the feed stream heater of said distillation system connected thereto;

(c) means connected to said distillation system for varying the flow rate of inert gas combined with said feed stream in step (b) in direct proportion to variations in the flow rate of said feed stream and additionally to maintain the ratio of flow rate of inert gas to flow rate of feed stream at a level such that the residence time of the feed stream in said heater is minimized;

(d) means connected to said distillation system for introducing an inert gas stream into the distillation tower thereof;

(e) means connected to said distillation system for varying the flow rate of inert gas introduced into said distillation tower in direct proportion to variations in the flow rate of said feed stream and additionally to maintain the ratio of the flow rate of inert gas to the flow rate of feed stream in said tower at a level such that the partial pressure of said feed stream in said tower is minimized;

(f) means connected to said distillation system for establishing a first signal representative of the maximum overflash in said tower;

(g) means connected to said distillation system for establishing a second signal representative of the actual overflash in said tower;

(h) means connected to said distillation system for comparing said first and second signals and establishing a third signal which is responsive to the difference between said second signal and said first signal, said third signal being scaled to be representative of the temperature of said combined inert gas-feed stream exiting said heater required to maintain said second signal substantially equal to said first signal;

(i) means connected to said distillation system for establishing a fourth signal representative of said required liquid bottom product specification;

(j) means connected to said distillation system for establishing a fifth signal representative of the actual specification of the liquid bottom product being produced;

(k) means connected to said distillation system for comparing said fourth and fifth signals and establishing a sixth signal which is responsive to the difference between said fifth signal and said fourth signal, said sixth signal being scaled to be representative of the temperature of said combined inert gas-feed stream exiting said heater required to maintain said fifth signal substantially equal to said fourth signal;

(l) means connected to said distillation system for selecting the one of said third and sixth signals which represents the lowest temperature of said combined inert gas-feed stream exiting said heater; and (m) means connected to said distillation system for controlling the heating of said combined inert gas-feed stream in said heater in response to the selected third or sixth signal.

13. The apparatus of claim 12 wherein said second signal representing the actual overflash in said tower is established by means connected to said distillation system for subtracting the actual flow rate of overhead product withdrawn from said distillation tower from the calculated flow rate of vaporized feed within said tower.

14. The apparatus of claim 12 wherein means are connected to said distillation system for controlling the flow rate of withdrawal of said sidedraw liquid product in response to said sixth signal prior to said sixth signal being scaled.

15. The apparatus of claim 12 which is further characterized to include:

means connected thereto for establishing signals representative of maximum and actual levels of other process conditions which change with the temperature of said combined inert gas-feed stream exiting said heater comprised of the pressure differential across said distillation tower, the flow rate of overhead non-condensing gas, the flow rate of fuel to said heater, the total distillation tower pressure, and the ratio of the flow rate of overhead non-condensing gas to the flow rate of said feed stream;

means connected to said distillation system for comparing said signals representing the maximum and actual levels for each such process condition and establishing an additional signal which is responsive to the differences therebetween, the additional signal being scaled to be representative of the temperature of said combined inert gas-feed stream exiting said heater required to maintain said signals representing desired and actual levels for each process condition substantially equal; and means connected to said distillation system for selecting one of said third, sixth and additional signals for controlling the heating of said combined inert gas-feed stream.

16. The apparatus of claim 15 wherein said feed stream is reduced crude oil, said inert gas is steam, said bottom product is asphalt and said required bottom product specification is minimum viscosity.

17. The apparatus of claim 16 wherein said means for establishing a fifth signal representative of the actual viscosity of said asphalt is comprised of a viscosity analyzer.

* * * * *